No. 731,604. PATENTED JUNE 23, 1903.
R. O. NEWELL.
CORN PLANTER.
APPLICATION FILED JUNE 8, 1901.
NO MODEL. 4 SHEETS—SHEET 3.
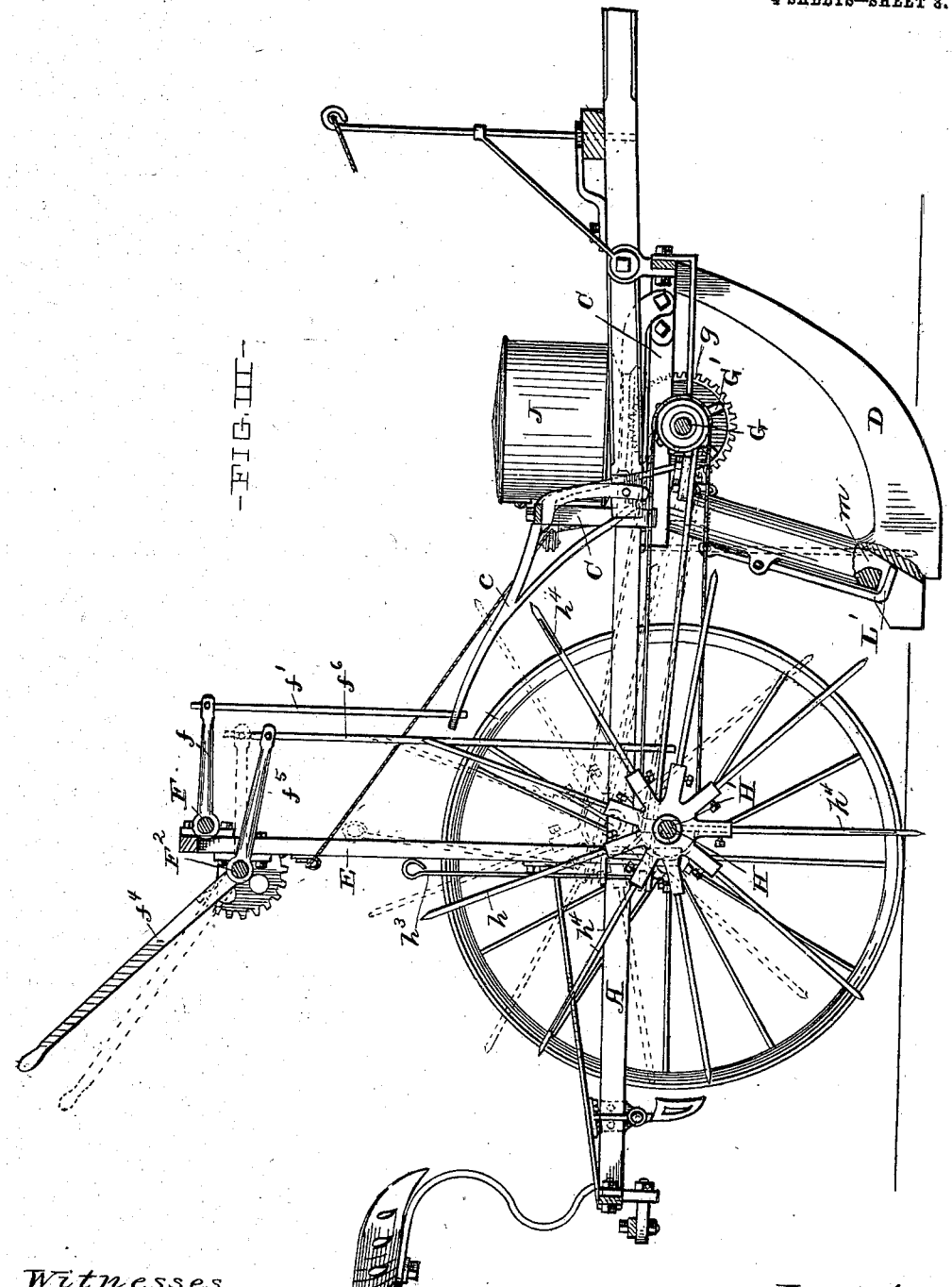
Witnesses,
J. C. Turner
A. E. Merkel
Inventor,
R. O. Newell
By J. B. Fay
Atty.

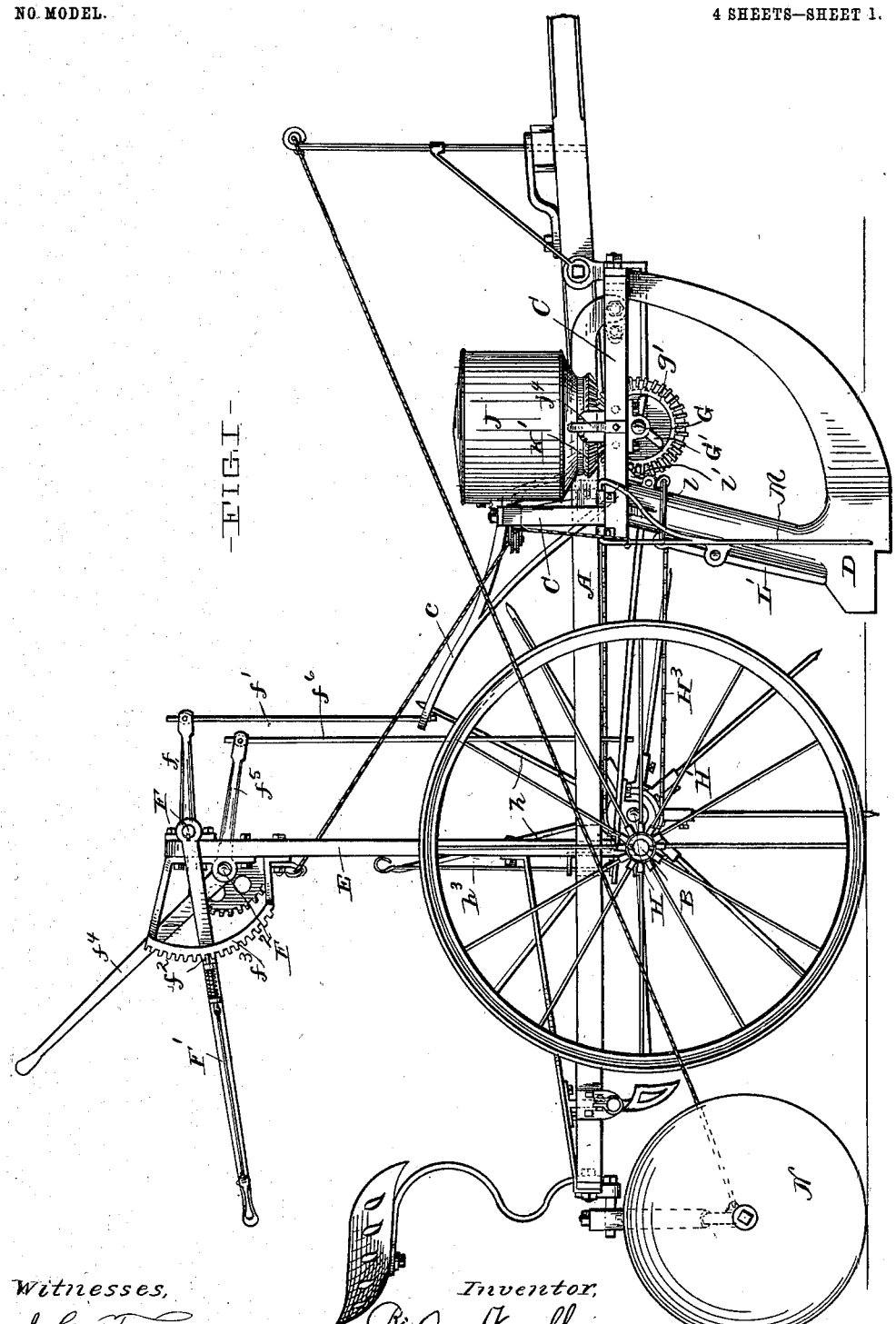

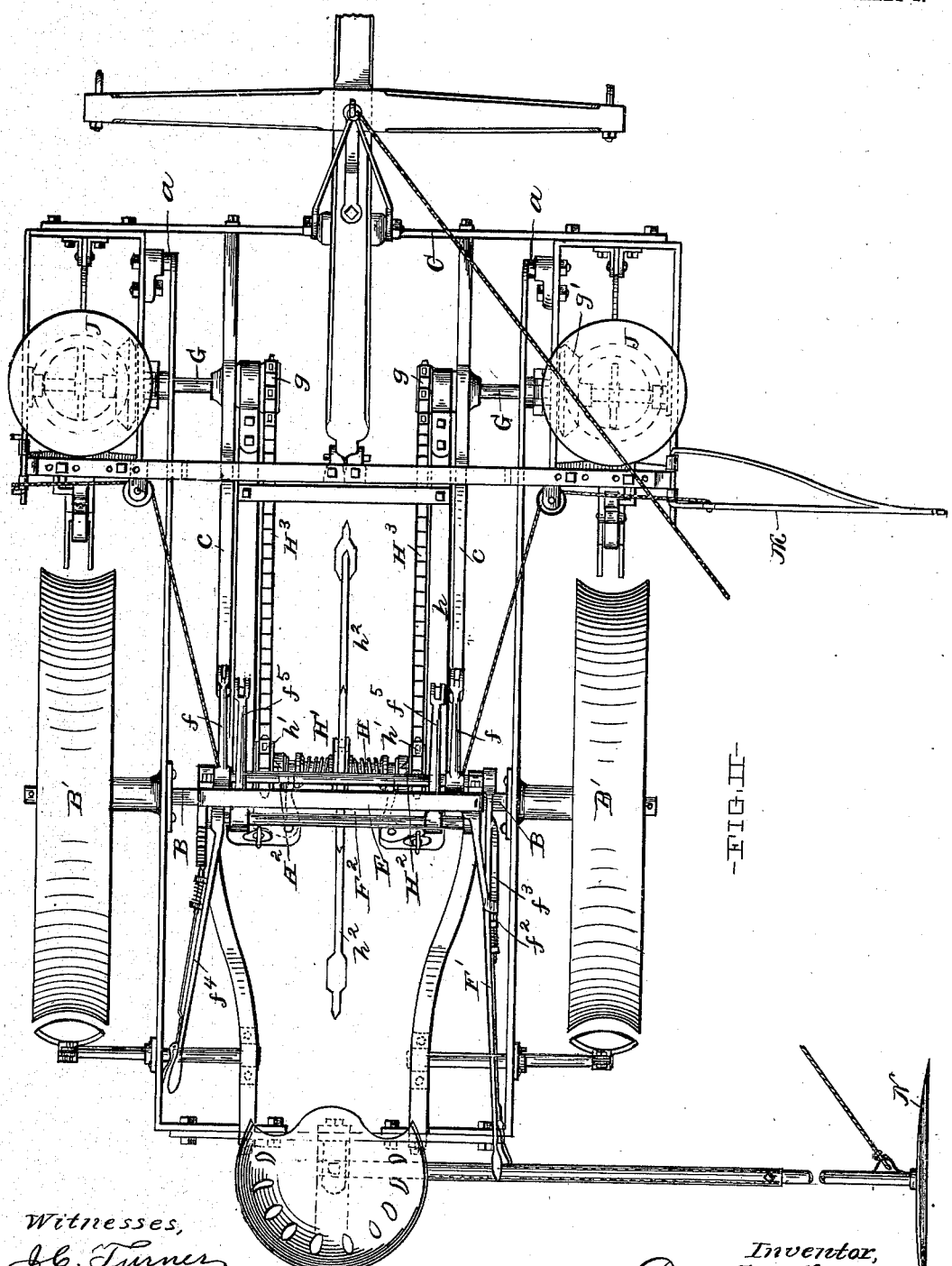

No. 731,604. PATENTED JUNE 23, 1903.
R. O. NEWELL.
CORN PLANTER.
APPLICATION FILED JUNE 8, 1901.
NO MODEL. 4 SHEETS—SHEET 4.
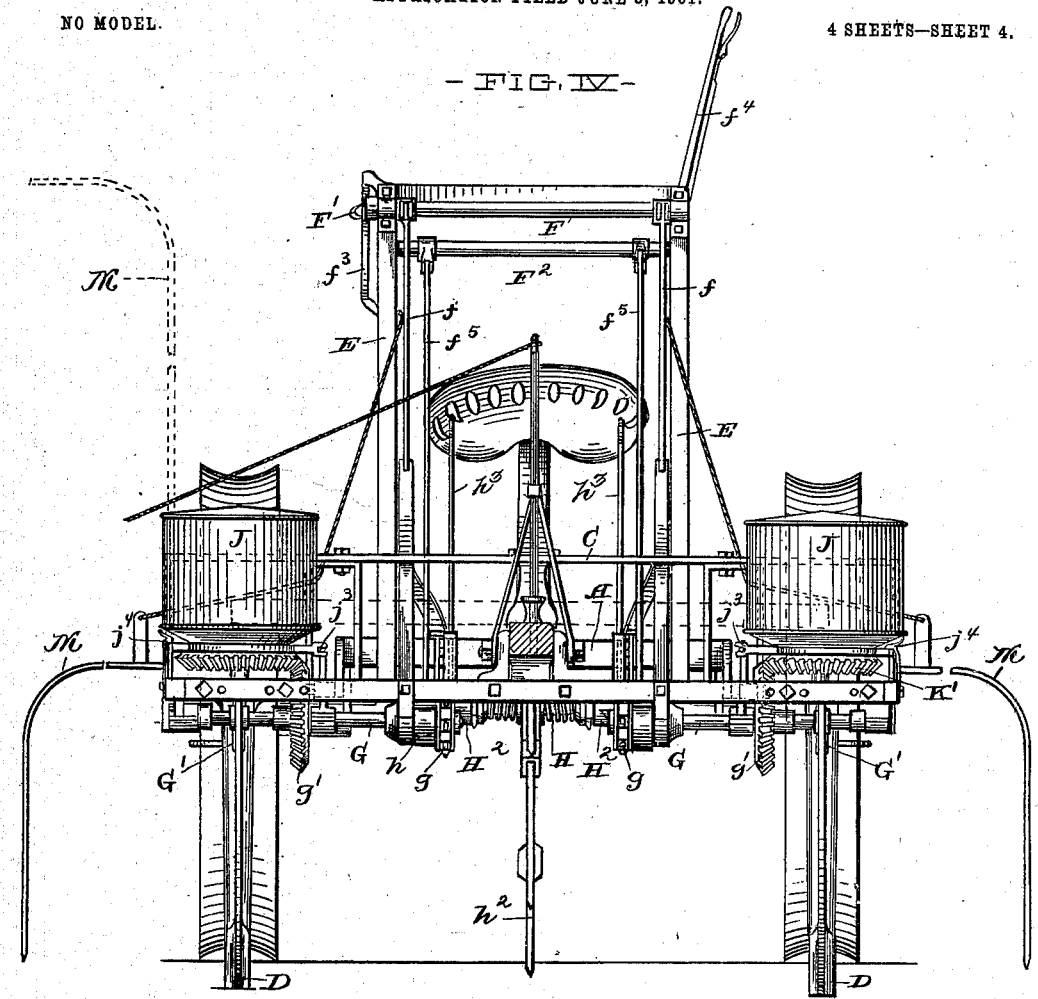
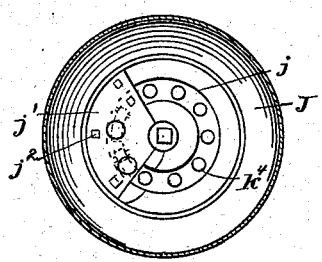
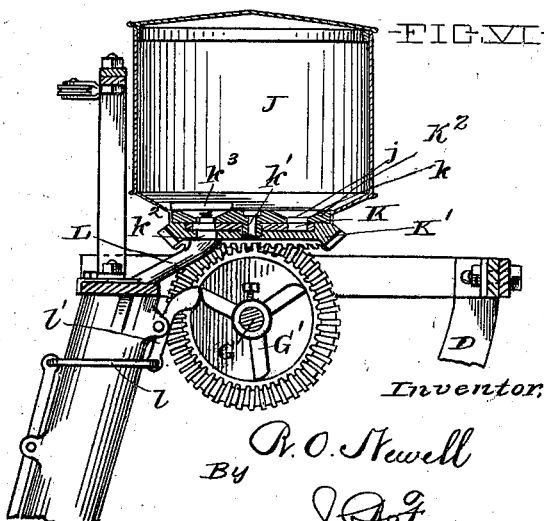
Witnesses
J. C. Turner
A. E. Merkel
Inventor
R. O. Newell
By J. B. Fay Atty.

No. 731,604.

Patented June 23, 1903.

UNITED STATES PATENT OFFICE.

RALPH O. NEWELL, OF VENUS, NEBRASKA.

CORN-PLANTER.

SPECIFICATION forming part of Letters Patent No. 731,604, dated June 23, 1903.

Application filed June 8, 1901. Serial No. 63,681. (No model.)

*To all whom it may concern:*

Be it known that I, RALPH O. NEWELL, a citizen of the United States, and a resident of Venus, county of Knox, and State of Nebraska, have invented a new and useful Improvement in Corn-Planters, of which the following is a specification, the principle of the invention being herein explained and the best mode in which I have contemplated applying that principle, so as to distinguish it from other inventions.

My invention relates to machines for planting corn, its object being to effect such planting economically—that is, with the least possible expenditure of time.

Said invention consists of means hereinafter fully described, and specifically set forth in the claims.

The annexed drawings and the following description set forth in detail certain mechanism embodying the invention, such disclosed means constituting but one of various mechanical forms in which the principle of the invention may be used.

In said annexed drawings, Figure I represents a side elevation of a corn-planter embodying my invention. Fig. II represents a top plan view of same. Fig. III represents a vertical longitudinal section of same. Fig. IV represents a front view. Figs. V and VI represent enlarged detail horizontal and vertical sections, respectively, of the seed-dropping mechanism, adjacent mechanism being shown in Fig. VI.

A main frame A is journaled upon the planter-axles B B and extends forwardly and rearwardly thereof, as shown in Fig. II. Upon the forward end of such frame A is journaled at $a$ $a$, Fig. II, a cross-frame C, upon which are secured the plows or furrow-openers D and the seed-dropping mechanism, hereinafter described. An upright U-shaped frame E is supported on bearings journaled upon the said axle. Said frame E forms a support for rock-shaft F, upon which are secured two rocking arms $f$, to whose ends are hung two rods $f'$, whose lower extremities are secured to two arms $c$ $c$, respectively, which are fixed to the cross-frame C, as may be seen in Figs. I and IV. A lever $F'$, provided with a spring-stop $f^2$, coöperating with a segment $f^3$, according to the construction ordinarily employed in machines of this class, is secured to said shaft F and may be caused to raise or lower the front portion of the machine, and thereby lift the plows from or permit them to enter the soil in which it is desired to plant the corn.

Upon the lower extremities of the upright frame E are secured or formed the axles B, upon which are mounted the wheels B' B', the space intermediate of such extremities being thereby left free and open.

Upon the cross-frame C are mounted in suitable bearing and one on each side of the central vertical plane of the machine two transverse shafts G G, to each of whose inner extremities is secured a sprocket-wheel $g$, each shaft being provided with a beveled gear-wheel $g'$ intermediate of its extremities, as shown in Fig. IV. Upon each such shaft and near its inner extremity is journaled one end of a member $h$ of a secondary frame which extends back between the wheels, as shown in Fig. II. The free rear end of such frame carries a shaft H, upon each of whose ends is mounted a sprocket $h'$. Intermediately of such sprockets and upon the middle of such shaft is secured a driving spur or rimless wheel H', provided with nine spurs $h^2$.

Two clutches $H^2$ $H^2$, operated by suitable levers and rods $h^3$, are provided and arranged so as to permit either one or both the sprockets $h'$ to be thrown into or out of gear with the shaft, and hence with the spur-wheel. Two sprocket-chains $H^3$ form the connection between sprockets $g$ $g$ and $h'$ $h'$, as shown in Fig. II, whereby it is seen shafts G G may be driven by spur-wheel H'.

Upon the upright frame E is mounted a second shaft $F^2$, provided with a lever $f^4$ and two rocking arms $f^5$ $f^5$, which are connected with the frame members $h$ by means of rods $f^6$, through the medium of which the spur-wheel may be raised or lowered. Said spur-wheel is provided with three spurs $h^4$, Fig. III, having paddle-like portions secured transversely at the ends thereof, such spurs being placed at equal intervals around the periphery of the spur-hub. These spurs are adapted to imprint in the soil a ground-mark of a character such as may be easily and readily distinguished from those made by the remaining spurs.

The free end of the secondary frame may be raised or lowered and the spur-wheel caused to engage or disengage the ground, according as it is desired to effect or discontinue the operation of the machine.

Upon each end of the cross-frame C is secured a seedbox J, the bottom of which is formed with an annular opening $j$, having downwardly-sloping sides, Fig. VI. Beneath said opening is seated a rotatable disk K, pierced by a series of seed-holding openings $k$. A portion of said annular opening is covered by a metal plate or cut-off $j'$, secured by bolts $j^2$, Fig. V. Said disk K is seated in a recessed beveled gear-rim K', which is held in place by means of a stationary plate $K^2$, which is secured by means of a bolt $k'$. Said plate is provided with a discharge-opening $k^2$ beneath the plate $j'$, which registers with the upper end of a spout L, which discharges into the interior passage-way $m$, formed in the plow or furrow-opener D. The bottom opening of said passage-way is controlled by a valve L', which is pivoted upon the plow, as shown in Fig. III, and is operated by means of a link $l$, lever $l'$, and a three-spurred wheel G', one of which is secured to each outer end portion of shaft G, whereby said valve is caused to open and close three times during each revolution of the shaft G.

Immediately above the discharge-opening $k^2$ is located in an aperture formed in bottom of the seedbox a spring-actuated ejector $k^3$, which normally projects into the seed-recesses $k^4$ formed in the disk as they pass beneath it. Said plunger assures the ejection of seed from such recesses into the spout L.

The principle of the operation of the seed-dropping mechanism and the construction and operation of the plow in connection therewith is identical with that employed in other machines of this character, the particular arrangement of the parts as described being, however, claimed as new. Each seedbox is removably secured to the cross-frame by means of an open hinge $j^3$, Fig. IV, and a latch $j^4$, whereby the boxes may be readily removed and replaced.

To each side of the machine is pivoted an indicating-arm M, Figs. I and IV, which is operated by means of a cord or chain, the end of which is detachably secured in any suitable manner to the upright frame E, as shown in Fig. III. The outer extremity of said arm is bent in a manner such as to permit it when in its lowered position to rest upon the soil. The length of such arm is such as to cause the distance from the point of contact of its said extremity to the central plane of the adjacent plow to be substantially one and one-half times the distance between the central planes of the two plows, the purpose of which will hereinafter appear.

A marking-disk N, Figs. I and II, is suitably secured to the rear end of the machine in any of the well-known ways in which such disks are secured, so as to be capable of being shifted from one side to the other, as is well understood and in use in other machines of this character, such disk or its method of attachment and operation forming no part of my invention.

The spur-wheel H' and seed-dropping mechanism are connected as described and in a manner such that one of the spurs of said wheel which is provided with a paddle-like portion will strike the soil substantially upon a line drawn between the two points in the furrows formed by the plow at which seed have been dropped when the machine is drawn forward and the driving spur-wheel is lowered into contact with the soil.

In operating the machine the levers F' and $f^4$ are manipulated in a manner such as to lower the plow and driving spur-wheel into the soil. Upon the forward movement of the machine the spur-wheel is rotated, thereby operating the seeding mechanism, seed being periodically dropped through the discharge-opening $k^2$ by the rotating disk K through the spout L into the interior passage-way of the plow. Such seed are periodically discharged from such passage-way into the furrow formed by the corresponding plow by the opening of the valve L', which is effected by the rotation of the spur-wheel G' and the consequent periodic engagement of the lever $l'$. Upon reaching the end of the furrow both the plows and the spur driving-wheel are lifted and disengaged from the soil. The machine then being turned to start the next row, it is drawn forward in the new direction and the indicating-arm M on the side of the last-planted row and the plows lowered. The machine is then moved forward until the end of said arm rests approximately upon the last ground-mark made by the paddle-like portion of the driving-spurs. The driving spur-wheel is then turned by hand until the valves open and seed are dropped. Immediately upon such action the driving spur-wheel is lowered into contact with the soil, the indicating-arm drawn up, and the machine started forward to plant the next row. Such above-described manipulation, it is seen, causes the first hills of corn in each row to begin upon the same straight line, which is the object to be obtained.

When it is desired to effect the operation of but one seed-dropper, the one or the other clutch mechanism is caused to throw the corresponding sprocket $h'$ out of gear with the shaft H, as is desired.

Other modes of applying the principle of my invention may be employed instead of the one explained, change being made as regards the mechanism herein disclosed, provided the means covered by any one of the following claims be employed.

I therefore particularly point out and distinctly claim as my invention—

1. In a corn-planter, the combination of duplex seed-dropping mechanism, a driving spur-wheel, means for raising and lowering such wheel, connections between the latter and the seed-dropping mechanism for driving the latter, and clutch mechanism for connecting such dropping mechanism with or disconnecting same from said wheel.

2. In a corn-planter, the combination of a main frame pivoted upon the corn-planter wheels, a secondary frame pivoted upon such main frame, duplex seed-dropping mechanism on such secondary frame, a spur-wheel journaled upon the latter, connections for operating said dropping mechanism by means of said spur-wheel, means for raising and lowering the latter, and clutch mechanism for connecting or disconnecting either of such dropping mechanisms.

3. In a corn-planter, the combination of duplex seed-dropping and furrowing means, a spur-wheel connected with and adapted to operate the seed-dropping mechanism and to effect distinctive ground-marks midway between the furrows formed by the furrowing means, and an adjusting-rod secured to the side of the planter having its extremity removed laterally therefrom a distance equal to one and one-half times that between said furrowing means.

Signed by me this 8th day of May, 1901.

RALPH O. NEWELL.

Attest:
D. T. DAVIES,
A. E. MERKEL.